United States Patent
Kobayashi et al.

(10) Patent No.: US 12,420,836 B2
(45) Date of Patent: Sep. 23, 2025

(54) VEHICLE CONTROL DEVICE

(71) Applicant: HONDA MOTOR CO., LTD., Tokyo (JP)

(72) Inventors: Takuma Kobayashi, Tokyo (JP); Yuichi Komori, Tokyo (JP); Yuko Sugimura, Tokyo (JP); Yuichi Masukake, Tokyo (JP); Yugo Kajiwara, Tokyo (JP); Shohei Noai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 18/586,599

(22) Filed: Feb. 26, 2024

(65) Prior Publication Data
US 2024/0300534 A1   Sep. 12, 2024

(30) Foreign Application Priority Data
Mar. 8, 2023   (JP) ................ 2023-035934

(51) Int. Cl.
*B60W 60/00*   (2020.01)
*B60W 40/08*   (2012.01)
(Continued)

(52) U.S. Cl.
CPC ........ *B60W 60/0015* (2020.02); *B60W 40/08* (2013.01); *B60W 50/14* (2013.01);
(Continued)

(58) Field of Classification Search
CPC ..... B60W 2050/009; B60W 2050/143; B60W 2050/146; B60W 2420/403; B60W 30/09;
(Continued)

(56) References Cited

U.S. PATENT DOCUMENTS 9,084,105 B2 *   7/2015   Luna ................ H04L 67/04
9,529,889 B2 *  12/2016   Ishii ................ G06F 16/285
(Continued)

FOREIGN PATENT DOCUMENTS

CN   102259629 A  * 11/2011
CN   112389448 A  *  2/2021   ............ B60W 40/09
(Continued)

OTHER PUBLICATIONS

Nov. 5, 2024, Translation of Japanese Office Action issued for related JP Application No. 2023-035934.

*Primary Examiner* — Babar Sarwar
(74) *Attorney, Agent, or Firm* — Paratus Law Group, PLLC

(57) ABSTRACT

A vehicle controller is configured to: recognize a surrounding situation of a vehicle; execute first control of giving a first alarm to an occupant of the vehicle in response to a first condition being satisfied; execute second control of controlling braking or steering of the vehicle and giving a second alarm to the occupant in response to a second condition being satisfied; detect an abnormality of the occupant; execute third control of decelerating or stopping the vehicle and giving a third alarm in response to the abnormality of the occupant; and arrange execution of the first, second and third control. The vehicle controller executes the third control with priority over the first control when conditions of the first control and the third control are satisfied; and executes the second control with priority over the third control when conditions of the second control and the third control are satisfied.

5 Claims, 8 Drawing Sheets

(51) Int. Cl.
  *B60W 50/00*  (2006.01)
  *B60W 50/14*  (2020.01)
  *G06V 20/59*  (2022.01)

(52) U.S. Cl.
  CPC ..... *G06V 20/597* (2022.01); *B60W 2050/009* (2013.01); *B60W 2050/143* (2013.01); *B60W 2050/146* (2013.01); *B60W 2420/403* (2013.01)

(58) Field of Classification Search
  CPC .. B60W 40/08; B60W 50/14; B60W 60/0015; G06V 20/597
  See application file for complete search history.

(56) References Cited

U.S. PATENT DOCUMENTS

| | | | | |
|---|---|---|---|---|
| 11,562,550 | B1* | 1/2023 | Asghar | G06F 3/012 |
| 2012/0216208 | A1* | 8/2012 | Takemura | G08G 1/167 |
| | | | | 718/103 |
| 2013/0038437 | A1* | 2/2013 | Talati | G06F 9/542 |
| | | | | 340/438 |
| 2014/0280177 | A1* | 9/2014 | Ishii | G06F 16/285 |
| | | | | 707/740 |
| 2019/0389454 | A1* | 12/2019 | Yang | B60W 30/025 |
| 2020/0070657 | A1* | 3/2020 | Kim | B60K 28/06 |
| 2020/0282984 | A1* | 9/2020 | Mizoguchi | B60W 60/005 |
| 2022/0063633 | A1* | 3/2022 | Moriya | G06F 3/167 |
| 2022/0169203 | A1* | 6/2022 | Chen | H04N 23/90 |
| 2023/0001893 | A1 | 1/2023 | Tanaka | |
| 2023/0106673 | A1* | 4/2023 | Asghar | A61B 5/0533 |
| | | | | 382/104 |
| 2023/0202506 | A1* | 6/2023 | Ishibashi | B60W 40/08 |
| | | | | 340/576 |

FOREIGN PATENT DOCUMENTS

| | | | | | |
|---|---|---|---|---|---|
| CN | 215399043 | U | * | 1/2022 | |
| CN | 118613413 | A | * | 9/2024 | ............ B60W 50/14 |
| DE | 112015003856 | T5 | * | 5/2017 | ............. B60Q 5/005 |
| EP | 3945509 | A1 | * | 2/2022 | ........ B60W 60/0016 |
| EP | 4063207 | A1 | * | 9/2022 | ................ B60T 7/14 |
| JP | 2014174861 | A | * | 9/2014 | ........... G06F 16/285 |
| JP | 2019046165 | A | * | 3/2019 | |
| JP | 2021-088213 | A | | 6/2021 | |

* cited by examiner

VEHICLE CONTROL DEVICE

CROSS-REFERENCE RELATED APPLICATIONS

This application is based on and claims priority under 35 USC 119 from Japanese Patent Application No. 2023-035934 filed on Mar. 8, 2023, the contents of which are incorporated herein by reference.

TECHNICAL FIELD

The present disclosure relates to a vehicle control device.

BACKGROUND

In recent years, attempts have been made to provide access to a sustainable transportation system in consideration of vulnerable traffic participants.

In order to improve the safety and convenience of traffic, research and development related to a driving support technique and an automated driving technique of a vehicle such as an automobile have been conducted as one of the attempts.

As an example of the driving support technique, there is a technique of automatically stopping (in other words, halting) a vehicle when it is detected that a driver is in an abnormal state (for example, a drowsy driving state or a mental and physical function stop state) in which the driver loses an ability to drive the vehicle.

Japanese Patent Application Laid-Open Publication No. 2021-88213 (hereinafter, referred to as Patent Literature 1) discloses a technique in which, when an abnormality of a driver is detected, an operation mode of deceleration control of automatically decelerating a vehicle in response to a determination that there is a possibility of a collision is set to a special mode from a normal mode when the abnormality is not detected, and in the special mode, a range for specifying an object around the vehicle as a collision target candidate is expanded compared to the normal mode.

However, in the related art, it has not been sufficiently studied which control is preferentially executed when execution conditions of a plurality of controls related to driving support are satisfied at the same time, and there is room for improvement from the viewpoint of improving safety of the vehicle.

The present disclosure provides a vehicle control device capable of improving safety of a vehicle by appropriately controlling the vehicle even when execution conditions of a plurality of controls related to driving support are satisfied at the same time.

SUMMARY

An aspect of the present disclosure relates to a vehicle control device that controls a vehicle, the vehicle control device including:
- a recognition circuit configured to recognize a surrounding situation of the vehicle;
- a first control circuit configured to execute first control of giving a first alarm to an occupant of the vehicle in response to a first execution condition being satisfied based on a recognition result of the recognition circuit;
- a second control circuit configured to execute second control of controlling braking or steering of the vehicle and giving a second alarm to the occupant in response to a second execution condition being satisfied based on the recognition result of the recognition circuit;
- an occupant abnormality detection circuit configured to detect an abnormality of the occupant;
- a third control circuit configured to execute third control of decelerating or stopping the vehicle and giving a third alarm in response to the abnormality of the occupant being detected by the occupant abnormality detection circuit; and
- an arrangement circuit configured to arrange execution of the first control, the second control, and the third control,
- in which the arrangement circuit:
  - causes the third control to be executed with priority over the first control when execution conditions of the first control and the third control are satisfied; and
  - causes the second control to be executed with priority over the third control when execution conditions of the second control and the third control are satisfied.

Advantageous Effects of Invention

According to the present disclosure, it is possible to provide the vehicle control device capable of improving safety of a vehicle by appropriately controlling the vehicle even when execution conditions of a plurality of controls related to driving support are satisfied at the same time.

BRIEF DESCRIPTION OF DRAWINGS

Exemplary embodiment(s) of the present invention will be described in detail based on the following figures, wherein.

DESCRIPTION OF EMBODIMENTS

Figure 1:
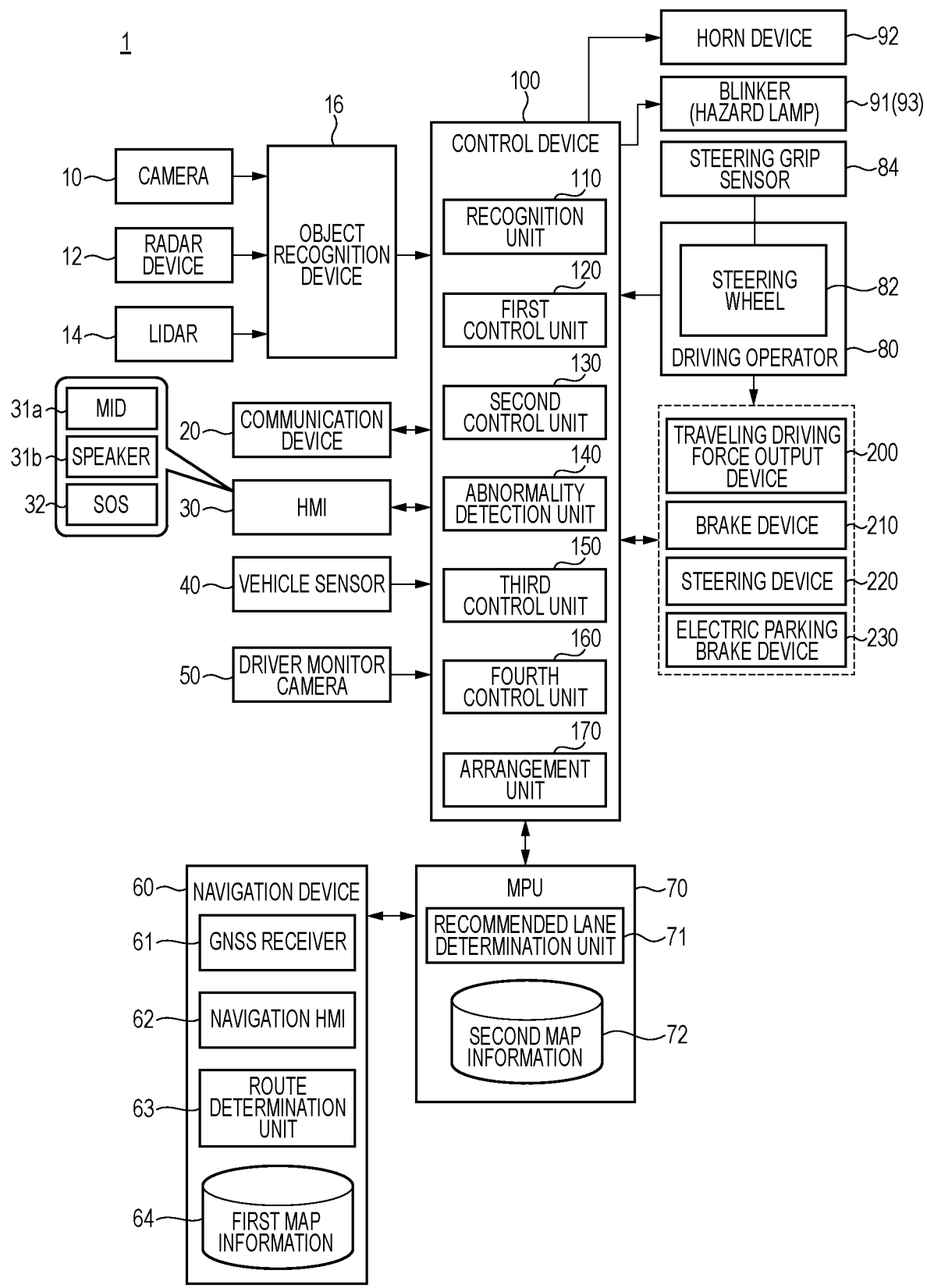
FIG. 1 is a block diagram showing an overall configuration of a vehicle system 1 including a control device 100 according to an embodiment.

Hereinafter, an embodiment of a vehicle control device according to the present disclosure will be described with reference to the drawings. The following embodiment does not limit the invention described in the scope of claims, and not all combinations of features described in the embodiment are essential to the invention. Two or more of a plurality of features described in the embodiment may be combined freely. In addition, in the following description, the same or similar elements are denoted by the same or similar reference numerals, and the description thereof may be omitted or simplified as appropriate. The drawings are viewed in directions of reference numerals.

Overall Configuration of Vehicle System 1

FIG. 1 is a block diagram showing an overall configuration of a vehicle system 1 including a control device 100 that is an embodiment of a vehicle control device of the present disclosure. Hereinafter, a vehicle on which the vehicle system 1 is mounted is referred to as a "own vehicle M". The own vehicle M is, for example, an automobile such as two-wheeled vehicle, three-wheeled vehicle, or four-wheeled vehicle, and a drive source thereof is an internal combustion engine such as a diesel engine or a gasoline engine, an electric motor, or a combination thereof. The electric motor operates using electric power generated by an electrical generator connected to the internal combustion engine or electric power discharged from a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a driver monitor camera 50, a navigation device 60, a map positioning unit (MPU) 70, a driving operator 80, a blinker 91 (hazard lamp 93), a horn device 92, the control device 100, a traveling driving force output device 200, a brake device 210, a steering device 220, and an electric parking brake device 230. These devices and equipment are connected to each other via, for example, a multiplex communication line such as a controller area network (CAN) communication line, a serial communication line, or a wireless communication network.

The camera 10 is, for example, a digital camera using a solid-state imaging element such as a charge coupled device (CCD) or a complementary metal oxide semiconductor (CMOS), and captures an image of the surroundings of the own vehicle M. The camera 10 is attached to any portion of the own vehicle M.

The radar device 12 emits radio waves such as millimeter waves to the surroundings of the own vehicle M, and detects radio waves (reflected waves) reflected by an object to detect at least a position (distance and orientation) of the object. The radar device 12 is attached to any portion of the own vehicle M.

The LIDAR 14 emits light (or an electromagnetic wave having a wavelength close to that of light) around the own vehicle M and measures scattered light. The LIDAR 14 detects a distance to a target based on a time elapsed from light emission to light reception. The emitted light is, for example, pulsed laser light. The LIDAR 14 is attached to any portion of the own vehicle M. In addition, the own vehicle M may not include the LIDAR 14.

The object recognition device 16 performs sensor fusion processing on some or all of detection results of the camera 10, the radar device 12, and the LIDAR 14 to recognize a position, a type, a speed, and the like of an object. The object recognition device 16 outputs a recognition result to the control device 100. The object recognition device 16 may output the detection results of the camera 10, the radar device 12, and the LIDAR 14 to the control device 100 as they are. In addition, when the own vehicle M does not include the LIDAR 14, the object recognition device 16 may recognize the position of the object or the like by performing the sensor fusion processing on the detection results of the camera 10 and the radar device 12.

The communication device 20 uses, for example, a cellular network, a Wi-Fi (registered trademark) network, Bluetooth (registered trademark), or dedicated short range communication (DSRC) to communicate with other vehicles present in the surroundings of the own vehicle M or communicate with various server devices via a radio base station.

The HMI 30 presents various types of information to an occupant of the own vehicle M and receives an input operation by the occupant. The HMI 30 includes various display devices including a multi information display (MID) 31a, various acoustic devices including a speaker 31b, various operators including an SOS button 32, and the like.

The vehicle sensor 40 includes a vehicle speed sensor that detects a travel speed (hereinafter also referred to as "vehicle speed") of the own vehicle M, an acceleration sensor that detects an acceleration, a yaw rate sensor that detects an angular speed around a vertical axis, an azimuth sensor that detects a direction of the own vehicle M, and the like.

The driver monitor camera 50 is, for example, a digital camera using a solid-state imaging device such as a CCD or a CMOS. The driver monitor camera 50 is attached to any portion of the own vehicle M in a position and a direction in which an image of a head of an occupant (hereinafter, also referred to as a "driver") seated in a driver's seat of the own vehicle M can be captured from the front (that is, in a direction in which an image of a face is captured).

The navigation device 60 includes, for example, a global navigation satellite system (GNSS) receiver 61, a navigation HMI 62, and a route determination unit 63. The navigation device 60 stores first map information 64 in a storage device such as a hard disk drive (HDD) or a flash memory.

The GNSS receiver 61 specifies a position of the own vehicle M based on a signal received from a GNSS satellite. The position of the own vehicle M may be specified or complemented by an inertial navigation system (INS) using an output of the vehicle sensor 40.

The navigation HMI 62 includes a display device, a speaker, a touch panel, a key, and the like. The navigation HMI 62 may be partially or entirely shared with the HMI 30 described above.

For example, the route determination unit 63 determines a route (hereinafter, also referred to as a "route on a map") from the position of the own vehicle M specified by the GNSS receiver 61 (or an input any position) to a destination input by the occupant using the navigation HMI 62 with reference to the first map information 64. The first map information 64 is, for example, information in which a road shape is expressed by a link indicating a road and nodes connected by the link. The first map information 64 may include a curvature of a road, point of interest (POI) information, and the like. The route on the map is output to the MPU 70.

The navigation device 60 may perform route guidance using the navigation HMI 62 based on the route on the map. The navigation device 60 may transmit the current position and the destination to a navigation server via the communication device 20 and obtain a route equivalent to the route on the map from the navigation server.

The MPU 70 includes, for example, a recommended lane determination unit 71, and stores second map information 72 in a storage device such as an HDD or a flash memory. The recommended lane determination unit 71 divides the route on the map provided from the navigation device 60 into a plurality of blocks (for example, divides the route on the map by 100 [m] in a vehicle traveling direction), and determines a recommended lane for each block with reference to the second map information 72. For example, the recommended lane determination unit 71 determines which lane from the left the vehicle is to travel in. When there is a branch point in the route on the map, the recommended lane determination unit 71 determines a recommended lane such that the own vehicle M can travel along a reasonable route for advancing to a branch destination.

The second map information 72 is map information with higher accuracy than the first map information 64. The second map information 72 includes, for example, information on a center of a lane or information on a boundary of the lane. The second map information 72 may include road information, traffic regulation information, address information, facility information, telephone number information, and the like. The second map information 72 may be updated as needed by the communication device 20 communicating with another device.

The driving operator 80 includes, for example, a blinker lever, an accelerator pedal, a brake pedal, a shift lever, and other operators in addition to a steering wheel 82. A sensor that detects an operation amount or presence or absence of an operation is attached to the driving operator 80, and a detection result thereof is output to some or all of the control device 100, the traveling driving force output device 200, the brake device 210, and the steering device 220.

The steering wheel 82 is not necessarily in an annular shape, and may be in a form of irregular steering, joy stick, a button, or the like. A steering grip sensor 84 is attached to the steering wheel 82. The steering grip sensor 84 is realized by a static capacitance sensor or the like, and outputs, to the control device 100, a signal capable of detecting whether the driver is gripping the steering wheel 82.

The blinker 91 is a direction indicator implemented by a lamp (lamp body) or the like provided on each of a left side (for example, left front and left rear) and a right side (for example, right front and right rear) of the own vehicle M so as to be visible from the outside of the own vehicle M. The blinker 91 is turned on or off in accordance with an operation of the blinker lever provided so as to be operable by the driver.

The blinker 91 can also function as the hazard lamp 93 that notifies the outside of the vehicle of the presence or the occurrence of an abnormality of the own vehicle M by simultaneously blinking (hereinafter also referred to as "hazard blinking") the lamps provided on the left side and the right side of the own vehicle M. The hazard lamp 93 is an example of a notification device. Although the hazard lamp 93 is implemented by the blinker 91 in the present embodiment, the hazard lamp 93 may be implemented by a lamp different from the blinker 91.

The horn device 92 notifies the outside of the vehicle of the presence or the occurrence of an abnormality of the own vehicle M by blowing a horn (hereinafter also referred to as "horn blowing"). The horn device 92 is another example of the notification device.

The traveling driving force output device 200 outputs, to wheels (specifically, driving wheels such as front wheels), a traveling driving force (torque) for the own vehicle M to travel. The traveling driving force output device 200 includes, for example, a combination of an internal combustion engine, an electric motor, a transmission, and the like, and an electronic control unit (ECU) that controls the combination. The ECU of the traveling driving force output device 200 controls the above-described configuration in accordance with information input from the control device 100 or information input from the driving operator 80.

The brake device 210 includes, for example, a brake caliper, a cylinder that transmits a hydraulic pressure to the brake caliper, an electric motor that generates the hydraulic pressure in the cylinder, and a brake ECU. The brake ECU controls the electric motor of the brake device 210 in accordance with the information input from the control device 100 or the information input from the driving operator 80, and outputs a brake torque according to a braking operation to each wheel.

The steering device 220 includes, for example, a steering ECU and an electric motor. The electric motor of the steering device 220 changes the direction of a steering wheel, for example, by applying a force to a rack-and-pinion mechanism. The steering ECU drives the electric motor of the steering device 220 in accordance with the information input from the control device 100 or the information input from the driving operator 80 to change the direction of the steering wheel.

The electric parking brake device 230 includes, for example, an electric motor that generates a gripping force (braking force) acting on a brake caliper by driving a brake pad so as to grip the brake caliper of the wheel (for example, a rear wheel, that is, a non-driving wheel) of the own vehicle M, and an electric parking brake ECU (hereinafter also referred to as an "EPB-ECU"). The EPB-ECU controls the electric motor of the electric parking brake device 230 in accordance with the information input from the control device 100 or the information input from the driving operator 80 to fix the wheels of the own vehicle M. That is, the electric parking brake device 230 is configured to fix the wheels by electronic control.

The control device 100 is a computer that integrally controls the entire own vehicle M, and includes, for example, a recognition unit 110, a first control unit 120, a second control unit 130, an occupant abnormality detection unit 140, a third control unit 150, a fourth control unit 160, and an arrangement unit 170. Each functional unit of the recognition unit 110, the first control unit 120, the second control unit 130, the occupant abnormality detection unit 140, the third control unit 150, the fourth control unit 160, and the arrangement unit 170 is realized by, for example, a hardware processor such as a central processing unit (CPU) executing a program (software). Some or all of these may be implemented by hardware (including circuitry) such as a large scale integration (LSI), an application specific integrated circuit (ASIC), a field-programmable gate array (FPGA), and a graphics processing unit (GPU), or may be implemented by cooperation of software and hardware. The program may be stored in advance in a storage device such as an HDD or a flash memory of the control device 100.

The recognition unit 110 recognizes a surrounding situation of the own vehicle M based on information input from the camera 10, the radar device 12, and the LIDAR 14 via the object recognition device 16. Specifically, the recognition unit 110 recognizes a position of an object around the own vehicle M, and a traveling state including a speed, an acceleration, and the like of the object. For example, the position of the object is recognized as a position on absolute coordinates with a representative point (a center of gravity, a drive shaft center, or the like) of the own vehicle M as an origin, and is used for control. The position of the object may be represented by a representative point such as a center of gravity or a corner of the object, or may be represented by an area. A "state" of the object may include an acceleration or jerk of the object, or an "action state" (for example, whether the object is changing lanes, or whether the object is about to change lanes). The object recognized by the recognition unit 110 includes, for example, another vehicle (hereinafter also referred to as a "preceding vehicle") M1 traveling in front of the own vehicle M. Here, the preceding vehicle may be a vehicle traveling in front of the own vehicle M in the same lane as the own vehicle M (for example, an own vehicle lane L1 to be described later).

For example, the recognition unit 110 recognizes a traveling environment in which the own vehicle M is traveling. As an example, the recognition unit 110 recognizes a travel lane of the own vehicle M (hereinafter, also referred to as the "own vehicle lane L1") by comparing a pattern of road partition lines (for example, an array of solid lines and broken lines) obtained from the second map information 72 with a pattern of road partition lines around the own vehicle M recognized from an image captured by the camera 10. The recognition unit 110 may recognize the travel lane by recognizing not only the road partition lines but also a course boundary (road boundary) including a road partition line, a road shoulder, a curbstone, a median strip, a guardrail, and the like. In the recognition, the position of the own vehicle M obtained from the navigation device 60 or a processing result of the INS may be added. For example, the recognition unit 110 may further recognize a predetermined stop position at which the own vehicle M should stop, such as a stop line (including a temporary stop line), a tollgate, or an obstacle on a road.

For example, when recognizing a travel lane, the recognition unit 110 recognizes a position and a posture of the own vehicle M with respect to the travel lane. As an example, the recognition unit 110 may recognize a deviation of a reference point of the hos vehicle M from a lane center and an angle of a traveling direction of the own vehicle M with respect to a line connecting the lane center, as a relative position of the own vehicle M with respect to the travel lane and a posture thereof. Alternatively, the recognition unit 110 may recognize a position of the reference point of the own vehicle M with respect to any side end portion (the road partition line or a road boundary) of the travel lane as the relative position of the own vehicle M with respect to the travel lane.

The first control unit 120 has a function capable of executing first control of giving a first alarm to an occupant (for example, a driver) of the own vehicle M in response to a first execution condition being satisfied based on a recognition result of the recognition unit 110. Here, the first execution condition is, for example, that an object having a risk of colliding with the own vehicle M is detected around the own vehicle M. In addition, the first alarm is, for example, an alarm for notifying that an object having a risk of colliding with the own vehicle M is present around the own vehicle M.

Figure 2:
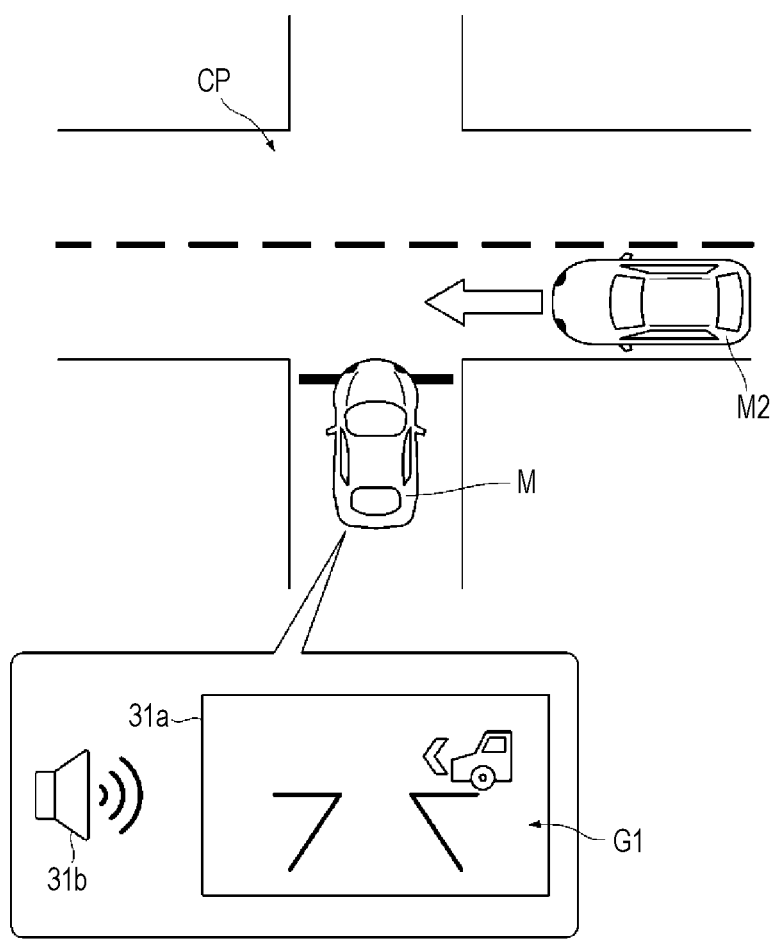
FIG. 2 is a diagram showing an example of front cross traffic alarm control according to the control device 100.

As an example, hereinafter, the first control will be described as front cross traffic alarm (FCTA) control. As shown in FIG. 2, the execution condition of the front cross traffic alarm control is that, when the own vehicle M travels at a low speed at the crossing point CP or starts from a stopped state at the crossing point CP, another vehicle (hereinafter, also referred to as a "crossing vehicle") M2 approaching the own vehicle M from the left and right front (in the shown example, the right front) is detected.

When the first control unit 120 executes the front cross traffic alarm control in response to the above execution condition being satisfied, as an example of the first alarm, the first control unit 120 causes the MID 31a to display an alarm image G1 that prompts attention to the front crossing vehicle M2, and causes the speaker 31b to output a predetermined alarm sound.

The second control unit 130 has a function of controlling braking or steering of the own vehicle M and capable of executing second control of giving a second alarm to the occupant in response to a second execution condition being satisfied based on the recognition result of the recognition unit 110. Here, for example, similarly to the first execution condition, the second execution condition is that an object having a risk of colliding with the own vehicle M is detected around the own vehicle M. Similarly to the first alarm, for example, the second alarm is an alarm for notifying that an object having a risk of colliding with the own vehicle M is present around the own vehicle M. The second control further includes, for example, travel control of the own vehicle M to avoid collision with an object having a risk of collision.

Figure 3:
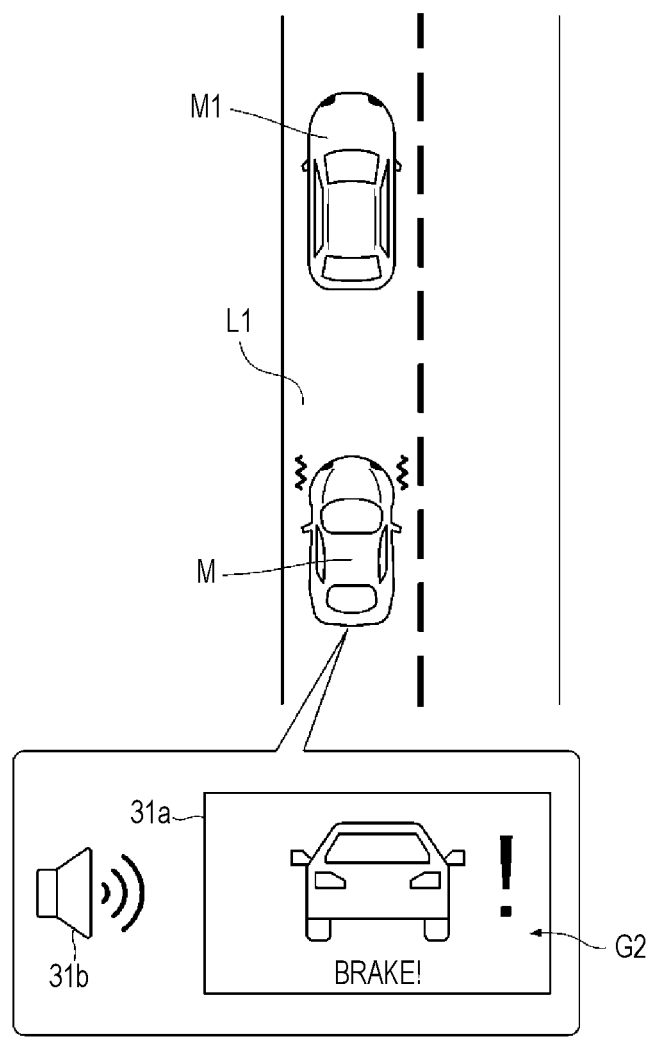
FIG. 3 is a diagram showing an example of collision mitigation control by the control device 100.

As an example, hereinafter, the second control will be described as collision mitigation control (CMBS: collision mitigation brake system). As shown in FIG. 3, an execution condition of the collision mitigation control is that an object having a risk of colliding with the own vehicle M, such as a preceding vehicle M1 traveling in the own vehicle lane L1, is detected in front of the own vehicle M while the own vehicle M is traveling.

When the second control unit 130 executes the collision mitigation control in response to the above execution condition being satisfied, as an example of the second alarm, the second control unit 130 causes the MID 31a to display an alarm image G2 instructing to perform the braking operation, and causes the speaker 31b to output a predetermined alarm sound. When the collision mitigation control is executed, the second control unit 130 can automatically brake the own vehicle M according to a distance from the own vehicle M to an object (in the shown example, the preceding vehicle M1) having a risk of collision. Further, at this time, the second control unit 130 may also control steering of the own vehicle M so as to avoid collision with an object having a risk of collision.

The occupant abnormality detection unit 140 detects an abnormality of the driver of the own vehicle M based on an operation on the SOS button 32, a video of the driver captured by the driver monitor camera 50, a signal from the steering grip sensor 84, and the like. Here, the abnormality of the driver refers to, for example, a state in which the driver loses awareness due to a sudden disease, a loss, or the like, or a state in which the driver cannot concentrate on driving due to a dozing, an inattentive driving, or the like, that is, a state in which the driver cannot perform a safe driving operation.

In the present embodiment, the occupant abnormality detection unit 140 detects an abnormality of the driver in response to a first detection condition being satisfied and a second detection condition being further satisfied after the first detection condition is satisfied. Here, the first detection condition is, for example, detection of a predetermined state in which a safe driving operation cannot be performed, such as posture collapse of the driver, eye closure, or release of both hands from the steering wheel 82. In addition, the second detection condition is, for example, that a predetermined cancellation operation is not performed within a predetermined time (for example, within 5 seconds) after the first detection condition is satisfied.

That is, in the present embodiment, the occupant abnormality detection unit 140 detects the abnormality of the driver when the posture collapse or the like of the driver is detected and the cancellation operation is not performed within a predetermined time after that. In the present embodiment, pressing of the SOS button 32 during a period from when the first detection condition is satisfied to when the second detection condition is satisfied is defined as the cancellation operation. For example, when the SOS button 32 is pressed before the first detection condition is satisfied, the occupant abnormality detection unit 140 may detect the abnormality of the driver at that time.

The third control unit 150 has a function capable of executing third control of decelerating or stopping the own vehicle M and giving a third alarm in response to detection of the abnormality of the driver by the occupant abnormality detection unit 140, that is, in response to the second detection condition being satisfied. Here, the third alarm is, for example, an alarm for notifying traffic participants around the own vehicle M that an abnormality has occurred in the driver of the own vehicle M. In addition, the third control includes, for example, travel control of the own vehicle M in which the own vehicle M is gradually decelerated in the own vehicle lane L1 until the own vehicle M stops. By performing such third control in response to the detection of the abnormality of the driver, it is possible to safely stop the own vehicle M and quickly rescue the driver of the own vehicle M. The third control may further include control in which the stopped wheels of the own vehicle M are fixed by the electric parking brake device 230.

As an example, hereinafter, the third control will be described as occupant abnormality handling control. A specific example of the occupant abnormality handling control will be described later.

The fourth control unit 160 has a function capable of executing fourth control of giving a fourth alarm to the driver during a period from when the first detection condition is satisfied to when the second detection condition is satisfied. Here, the fourth alarm is, for example, an alarm for notifying that the first detection condition is satisfied, and/or an alarm for giving advance notice of the start of the third control. As an example, hereinafter, the fourth control will be described as occupant abnormality detection control.

Figure 4:
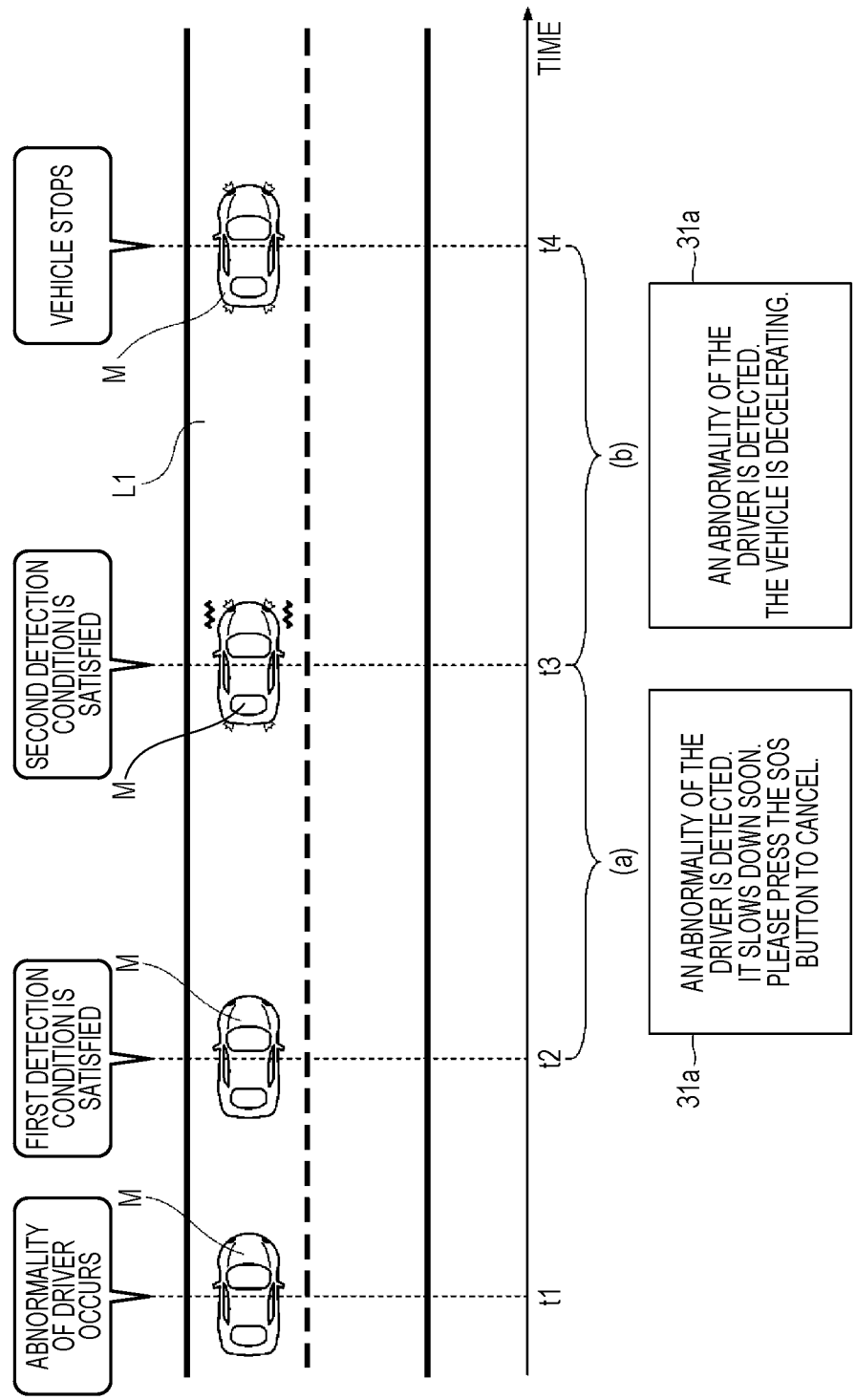
FIG. 4 is a diagram showing an example of occupant abnormality handling control and occupant abnormality detection control according to the control device 100.

An example of the occupant abnormality handling control and the occupant abnormality detection control will be specifically described with reference to FIG. 4. In the example of FIG. 4, it is assumed that an abnormality occurs in the driver at a time t1, the first detection condition is satisfied at a time t2 after the time t1, and the second detection condition is satisfied at a time t3 after the time t2.

In the case of the example of FIG. 4, the fourth control unit 160 executes the occupant abnormality detection control (that is, the fourth control) during a period from the time t2 to the time t3. When the occupant abnormality detection control is executed, as shown in (a) of FIG. 4, as an example of the fourth alarm, the fourth control unit 160 gives advance notice of the start of the occupant abnormality handling control, and causes the MID 31a to display a message (in the shown example, a message "an abnormality of the driver is detected. It slows down soon. Please press the SOS button in order to cancel") for guiding the cancellation operation. Accordingly, if no abnormality occurs in the driver (in other words, if the driver does not desire the operation of the occupant abnormality handling control), it is possible to prompt the driver to perform the cancellation operation.

Then, when the cancellation operation is not performed until the time t3 when a predetermined time has elapsed from the time t2, the third control unit 150 executes the occupant abnormality handling control (that is, the third control) from the time t3. When the occupant abnormality handling control is executed, the third control unit 150 gradually decelerates the own vehicle M in the own vehicle lane L1 until the own vehicle M stops. At this time, for example, the third control unit 150 gradually decelerates the own vehicle M while controlling the steering of the own vehicle M so that the own vehicle M does not deviate from the own vehicle lane L1. Further, in the example of FIG. 4, at a time t4 after the time t3, the own vehicle M is stopped in the own vehicle lane L1 by the occupant abnormality handling control.

When the third control unit 150 executes the occupant abnormality handling control, as shown in (b) of FIG. 4, as an example of the third alarm, the third control unit 150 performs in-vehicle notification for displaying, on the MID 31a, a message (in the shown example, a message "an abnormality of the driver is detected. The vehicle is decelerating.") for notifying that the occupant abnormality handling control is being executed because the abnormality of the driver is detected.

When the third control unit 150 executes the occupant abnormality handling control, the third control unit 150 also performs the out-of-vehicle notification by the horn blowing and the hazard blinking as another example of the third alarm. By performing such out-of-vehicle notification, it is possible to notify traffic participants around the own vehicle M of the occurrence of an abnormality in the driver of the own vehicle M.

When the occupant abnormality handling control is executed, the third control unit 150 may control the communication device 20 or the like to transmit predetermined emergency notification information to a predetermined external device such as a terminal device or a server device of a call center managed by a manufacturer of the own vehicle M, for example. Here, the emergency notification information includes, for example, information indicating that an abnormality occurs in the driver of the own vehicle M and information indicating the current position of the own vehicle M. Accordingly, it is possible to prompt an employee in a call center or the like to arrange an emergency vehicle such as an ambulance in order to rescue the driver of the own vehicle M. The third control unit 150 may transmit the emergency notification information at a time point when the abnormality of the driver is detected by pressing the SOS button 32, and may transmit the emergency notification information at a time point when the own vehicle M is stopped when the abnormality of the driver is detected by an image captured by the driver monitor camera 50 or the like. Accordingly, the emergency notification information can be transmitted at an appropriate timing.

At this time, the execution conditions of the front cross traffic alarm control (that is, the first control), the collision mitigation control (that is, the second control), and the occupant abnormality handling control (that is, the third control) may be satisfied at the same time. From the viewpoint of ensuring the safety of the own vehicle M, it is desirable to appropriately control the own vehicle M even if the execution conditions of the plurality of controls related to the driving support are satisfied at the same time.

In the present embodiment, the control device 100 further includes the arrangement unit 170 that arranges execution of the front cross traffic alarm control (that is, the first control), the collision mitigation control (that is, the second control), and the occupant abnormality handling control (that is, the third control). Further, the arrangement unit 170 may be configured to be able to arrange the execution of the occupant abnormality detection control.

<Example of Arrangement of Each Control by Arrangement Unit 170>

An example of arrangement of each control by the arrangement unit 170 will be specifically described with reference to FIG. 5. As shown in (a) of FIG. 5, in a case where the execution condition (that is, the second execution condition) of the collision mitigation control is satisfied when an abnormality of the driver is not detected (that is, before the second detection condition is satisfied), the arrangement unit 170 causes the second control unit 130 to execute the collision mitigation control. That is, in this case, an alarm (for example, the display of the alarm image G2 shown in FIG. 3) related to the collision mitigation control is given, and the own vehicle M can be automatically braked as the travel control of the own vehicle M related to the collision mitigation control.

Figure 5:
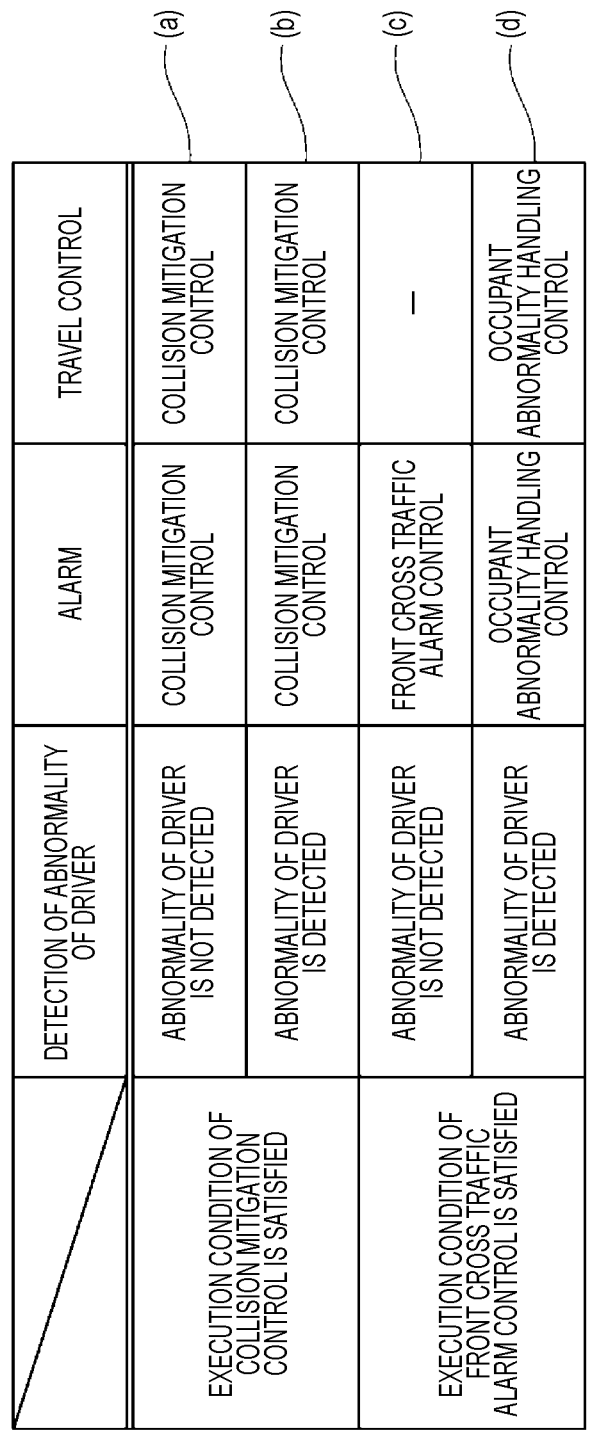
FIG. 5 is a diagram showing an example of arrangement of each control by the control device 100.

As shown in (b) of FIG. 5, in the case where the execution condition of the collision mitigation control is satisfied when the abnormality of the driver is detected (that is, after the second detection condition is satisfied), the arrangement unit 170 interrupts or stops the occupant abnormality handling control by the third control unit 150 started in response to the detection of the abnormality of the driver, and causes the second control unit 130 to execute the collision mitigation control. That is, also in this case, the alarm related to the collision mitigation control is given, and the own vehicle M can be automatically braked as the travel control of the own vehicle M related to the collision mitigation control.

In addition, as shown in (c) of FIG. 5, in a case where the execution condition (that is, the first execution condition) of the front cross traffic alarm control is satisfied when the abnormality of the driver is not detected, the arrangement unit 170 causes the first control unit 120 to execute the front cross traffic alarm control. That is, in this case, the alarm (for example, the display of the alarm image G1 shown in FIG. 2) related to the front cross traffic alarm control is given.

In addition, as shown in (d) of FIG. 5, in a case where the execution condition of the front cross traffic alarm control is satisfied when the abnormality of the driver is detected, the arrangement unit 170 does not cause the first control unit 120 to execute the front cross traffic alarm control, and causes the third control unit 150 to continue the occupant abnormality handling control. That is, in this case, even after the execution condition of the front cross traffic alarm control is satisfied, for example, the alarm related to the occupant abnormality handling control shown in (b) of FIG. 4 is performed, and the deceleration of the own vehicle M is continued (or the stopped state is maintained) as the travel control of the own vehicle M related to the occupant abnormality handling control.

<Processing by Control Device 100>

Next, an example of processing executed by the control device 100 will be described with reference to FIGS. 6 and 7. For example, the control device 100 executes the processing shown in FIGS. 6 and 7 at a predetermined cycle when an ignition power source of the own vehicle M is turned on.

Figure 6:
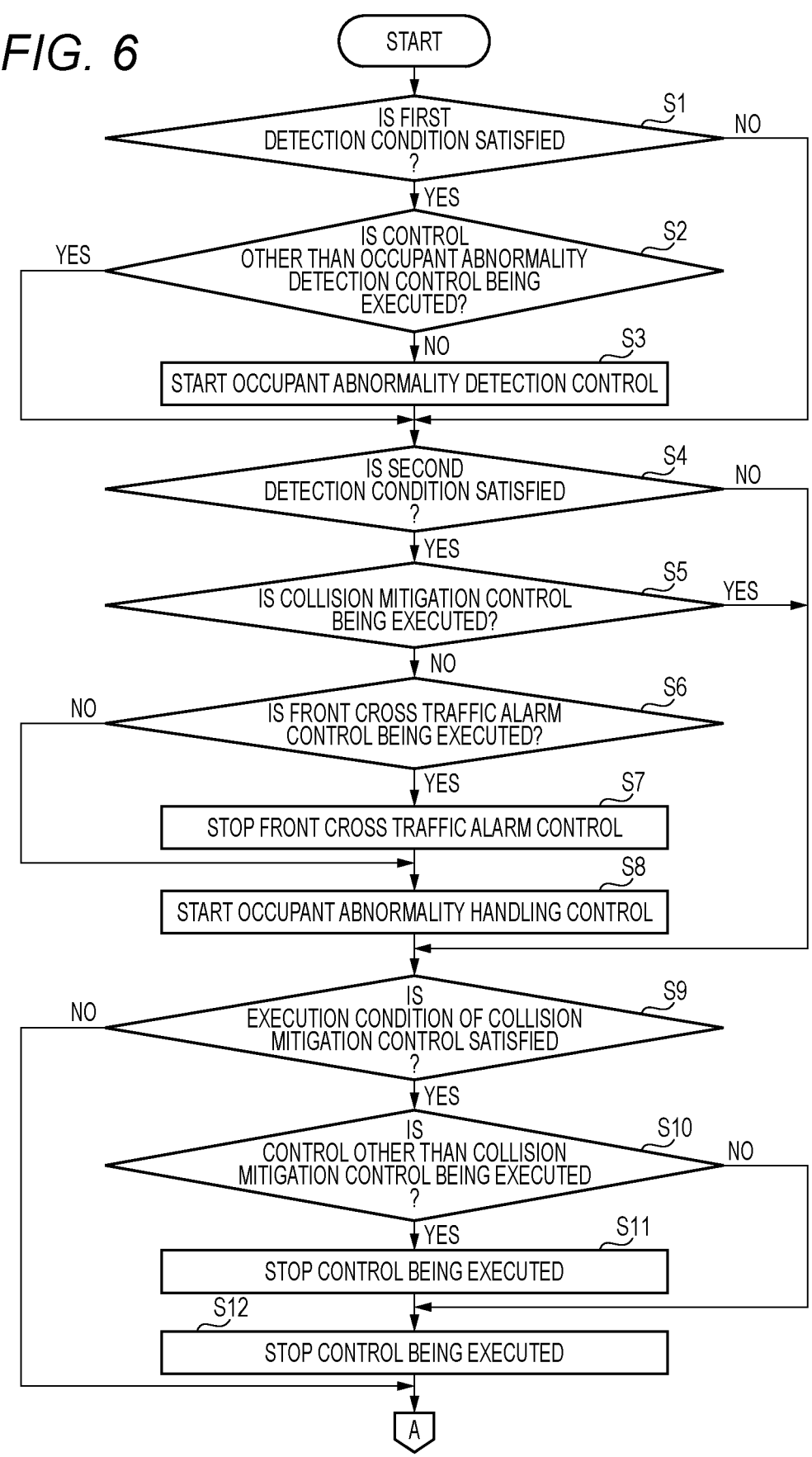
FIG. 6 is a flowchart (part 1) showing an example of processing executed by the control device 100.
Figure 7:
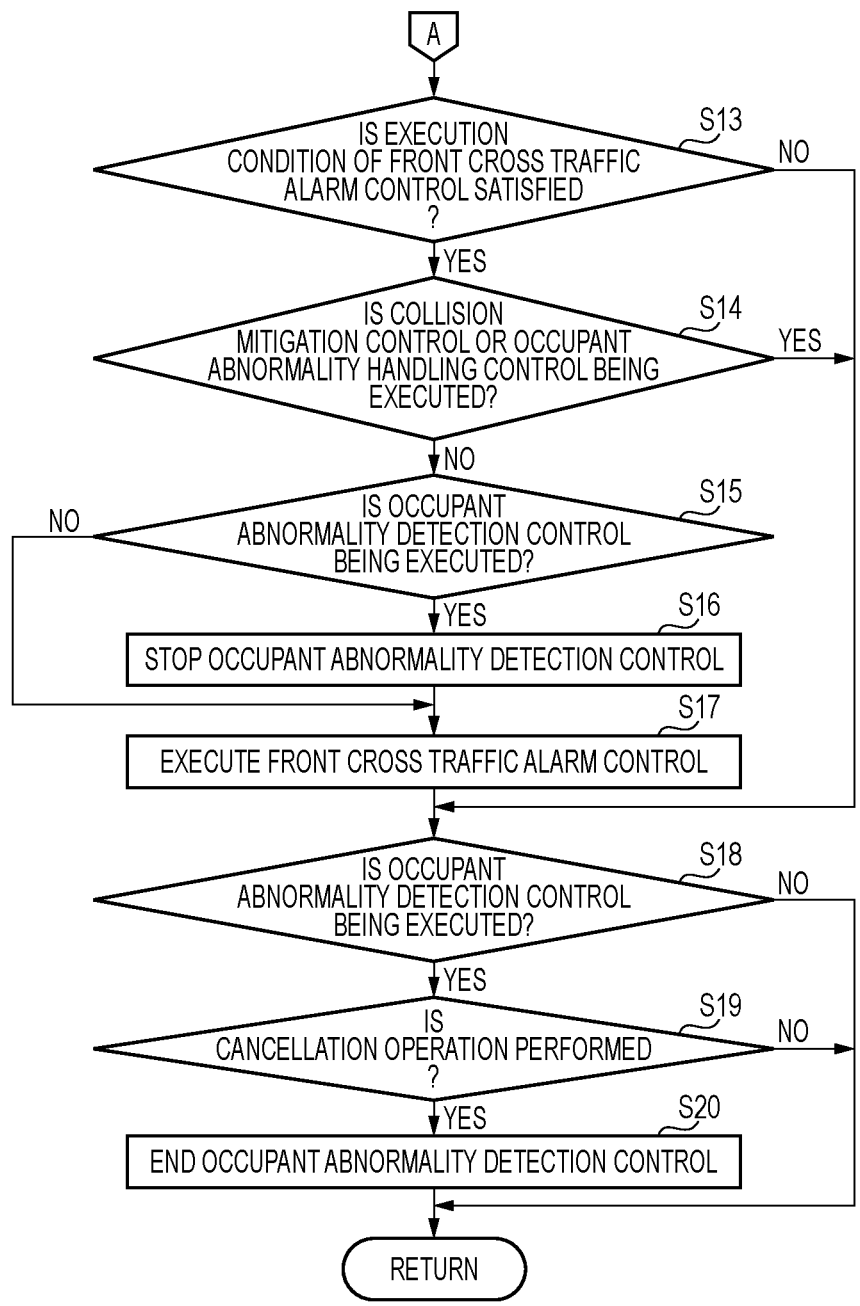
FIG. 7 is a flowchart (part 2) showing an example of the processing executed by the control device 100.

As shown in FIG. 6, the control device 100 first determines whether the first detection condition, which is the execution condition of the occupant abnormality detection control, is satisfied (step S1). When it is determined that the first detection condition is not satisfied (step S1: NO), the control device 100 proceeds to a process of step S4 to be described later.

When it is determined that the first detection condition is satisfied (step S1: YES), the control device 100 determines whether control other than the occupant abnormality detection control, such as the front cross traffic alarm control or the collision mitigation control, is being executed (step S2). When it is determined that the control other than the occupant abnormality detection control is being executed (step S2: YES), the control device 100 proceeds to the process of step S4 to be described later. On the other hand, when it is determined that the control other than the occupant abnormality detection control is not being executed (step S2: NO), the control device 100 starts the occupant abnormality detection control (step S3).

Next, the control device 100 determines whether the second detection condition, which is the execution condition of the occupant abnormality handling control, is satisfied (step S4). When it is determined that the second detection condition is not satisfied (step S4: NO), the control device 100 proceeds to a process of step S9 to be described later. On the other hand, when it is determined that the second detection condition is satisfied (step S4: YES), the control device 100 determines whether the collision mitigation control is being executed (step S5). When it is determined that the collision mitigation control is being executed (step S5: YES), the control device 100 proceeds to the process of step S9 to be described later.

When it is determined that the collision mitigation control is not being executed (step S5: NO), the control device 100 determines whether the front cross traffic alarm control is being executed (step S6). When it is determined that the front cross traffic alarm control is being executed (step S6: YES), the control device 100 stops the front cross traffic alarm control (step S7), starts the occupant abnormality handling control (step S8), and proceeds to the process of step S9 to be described later. On the other hand, when it is determined that the front cross traffic alarm control is not being executed (step S6: NO), the control device 100 starts the occupant abnormality handling control as it is (step S8), and proceeds to the process of step S9 to be described later.

Next, the control device 100 determines whether the execution condition of the collision mitigation control is satisfied. When it is determined that the execution condition of the collision mitigation control is not satisfied (step S9: NO), the control device 100 proceeds to a process of step S13 to be described later. On the other hand, when it is determined that the execution condition of the collision mitigation control is satisfied (step S9: YES), the control device 100 determines whether control other than the collision mitigation control, such as the occupant abnormality handling control, the front cross traffic alarm control, or the occupant abnormality detection control is being executed (step S10).

When it is determined that the control other than the collision mitigation control is being executed (step S10: YES), the control device 100 stops the control being executed (step S11), executes the collision mitigation control (step S12), and proceeds to the process of step S13 to be described later. On the other hand, when it is determined that the control other than the collision mitigation control is not being executed (step S10: NO), the control device 100 proceeds to the process of step S13 to be described later.

Next, the control device 100 determines whether the execution condition of the front cross traffic alarm control is satisfied. When it is determined that the execution condition of the front cross traffic alarm control is not satisfied (step S13: NO), the control device 100 proceeds to a process of step S18 to be described later. On the other hand, when it is determined that the execution condition of the front cross traffic alarm control is satisfied (step S13: YES), the control device 100 determines whether the collision mitigation control or the occupant abnormality handling control is being executed (step S14). When it is determined that the collision mitigation control or the occupant abnormality handling control is being executed (step S14: YES), the control device 100 proceeds to the process of step S18 to be described later.

When it is determined that the collision mitigation control or the occupant abnormality handling control is not being executed (step S14: NO), the control device 100 determines whether the occupant abnormality detection control is being executed (step S15). When it is determined that the occupant abnormality detection control is being executed (step S15: YES), the control device 100 stops the occupant abnormality detection control (step S17) and executes the front cross traffic alarm control (step S18). On the other hand, when it is determined that the occupant abnormality detection control is not being executed (step S15: NO), the front cross traffic alarm control is executed (step S18).

Next, the control device 100 determines whether the occupant abnormality detection control is being executed (step S18). When it is determined that the occupant abnormality detection control is not being executed (step S18: NO), the control device 100 ends the series of processes. When it is determined that the occupant abnormality detection control is being executed (step S18: YES), the control device 100 determines whether the cancellation operation is performed (step S19). When it is determined that no cancellation operation is performed (step S19: NO), the control device 100 ends the series of processes.

On the other hand, when it is determined that the cancellation operation is performed (step S19: YES), the control device 100 ends the occupant abnormality detection control (step S20), and ends the series of processes.

As described above, when the execution conditions of the front cross traffic alarm control (that is, the first control) and the occupant abnormality handling control (that is, the third control) are satisfied, the control device 100 preferentially executes the occupant abnormality handling control over the front cross traffic alarm control. In a state in which an abnormality occurs in the driver, even if the front cross traffic alarm control is executed, it is difficult for the driver to take some action in response to the alarm by the front cross traffic alarm control. Here, when the execution conditions of the front cross traffic alarm control and the occupant abnormality handling control are satisfied, the control device 100 preferentially executes the occupant abnormality handling control including the travel control of automatically decelerating or stopping the own vehicle M. Accordingly, even if the execution conditions of the front cross traffic alarm control and the occupant abnormality handling control are satisfied at the same time, it is possible to appropriately control the own vehicle M by the occupant abnormality handling control that can further improve safety, and the safety can be improved.

When the execution conditions of the collision mitigation control (that is, the second control) and the occupant abnormality handling control (that is, the third control) are satisfied, the control device 100 preferentially executes the collision mitigation control over the occupant abnormality handling control. It is considered that the collision mitigation control including the travel control of braking or steering the own vehicle M can contribute to further improvement in safety than the occupant abnormality handling control. When the execution conditions of the collision mitigation control and the occupant abnormality handling control are satisfied, the control device 100 preferentially executes the collision mitigation control, so that even if these execution conditions are satisfied at the same time, it is possible to appropriately control the own vehicle M by the collision mitigation control that can further improve safety, and the safety can be improved.

When the execution condition (that is, the first execution condition) of the front cross traffic alarm control is satisfied during the execution of the occupant abnormality handling control (that is, the third control), the control device 100 continues the occupant abnormality handling control without executing the front cross traffic alarm control (that is, the first control). Accordingly, even if the execution condition of the front cross traffic alarm control is satisfied during the execution of the occupant abnormality handling control, it is possible to continue to appropriately control the own vehicle M by the occupant abnormality handling control that can further improve safety, and the safety can be improved.

When the execution condition of the collision mitigation control (that is, the second execution condition) is satisfied during the execution of the occupant abnormality handling control (that is, the third control), the control device 100 interrupts or stops the occupant abnormality handling control and executes the collision mitigation control. Accordingly, after the execution condition of the collision mitigation control is satisfied during the execution of the occupant abnormality handling control, it is possible to appropriately control the own vehicle M by the collision mitigation control that can further improve safety, and the safety can be improved.

The control device 100 is configured to be able to execute the occupant abnormality detection control (that is, the fourth control) of giving advance notice of the start of the occupant abnormality handling control (that is, the third control) during the period from when the first detection condition is satisfied to when the second detection condition is satisfied. When the execution conditions of the front cross traffic alarm control (that is, the first control) and the occupant abnormality detection control are satisfied, the control device 100 preferentially executes the front cross traffic alarm control over the occupant abnormality detection control. It is considered that the front cross traffic alarm control executed based on the recognition result of the surrounding situation of the own vehicle M can contribute to improvement in safety more than the occupant abnormality detection control. When the execution conditions of the front cross traffic alarm control and the occupant abnormality detection control are satisfied, the control device 100 preferentially executes the front cross traffic alarm control, so that even if these execution conditions are satisfied at the same time, it is possible to appropriately control the own vehicle M by the front cross traffic alarm control that can further improve safety, and the safety can be improved.

When the execution condition (that is, the first execution condition) of the front cross traffic alarm control is satisfied during the execution of the occupant abnormality detection control (that is, the fourth control), the control device 100 interrupts or stops the occupant abnormality detection control and executes the front cross traffic alarm control. Accordingly, after the execution condition of the front cross traffic alarm control is satisfied during the execution of the occupant abnormality detection control, it is possible to appropriately control the own vehicle M by the front cross traffic alarm control that can further improve safety, and the safety can be improved.

The present invention is not limited to the embodiment described above. It is apparent that those skilled in the art may conceive of various modifications and changes within the scope described in the claims, and it is understood that such modifications and changes naturally fall within the technical scope of the present invention. In addition, the constituent elements in the embodiment described above may be freely combined without departing from the gist of the invention.

For example, in the embodiment described above, the second control has been described as being the collision mitigation control, but the second control is not limited to the collision mitigation control, and may be road departure mitigation (RDM) control, collision evasive steering support (ESS) control, or the like.

The second control unit 130 may be configured to be able to change the second execution condition, which is the execution condition of the collision mitigation control (that is, the second control), in response to the abnormality of the driver being detected by the occupant abnormality detection unit 140, and when an abnormality of the driver is detected, the second control unit 130 may change the second execution condition so that the collision mitigation control is more likely to be executed than when the abnormality of the driver is not detected.

Figure 8:
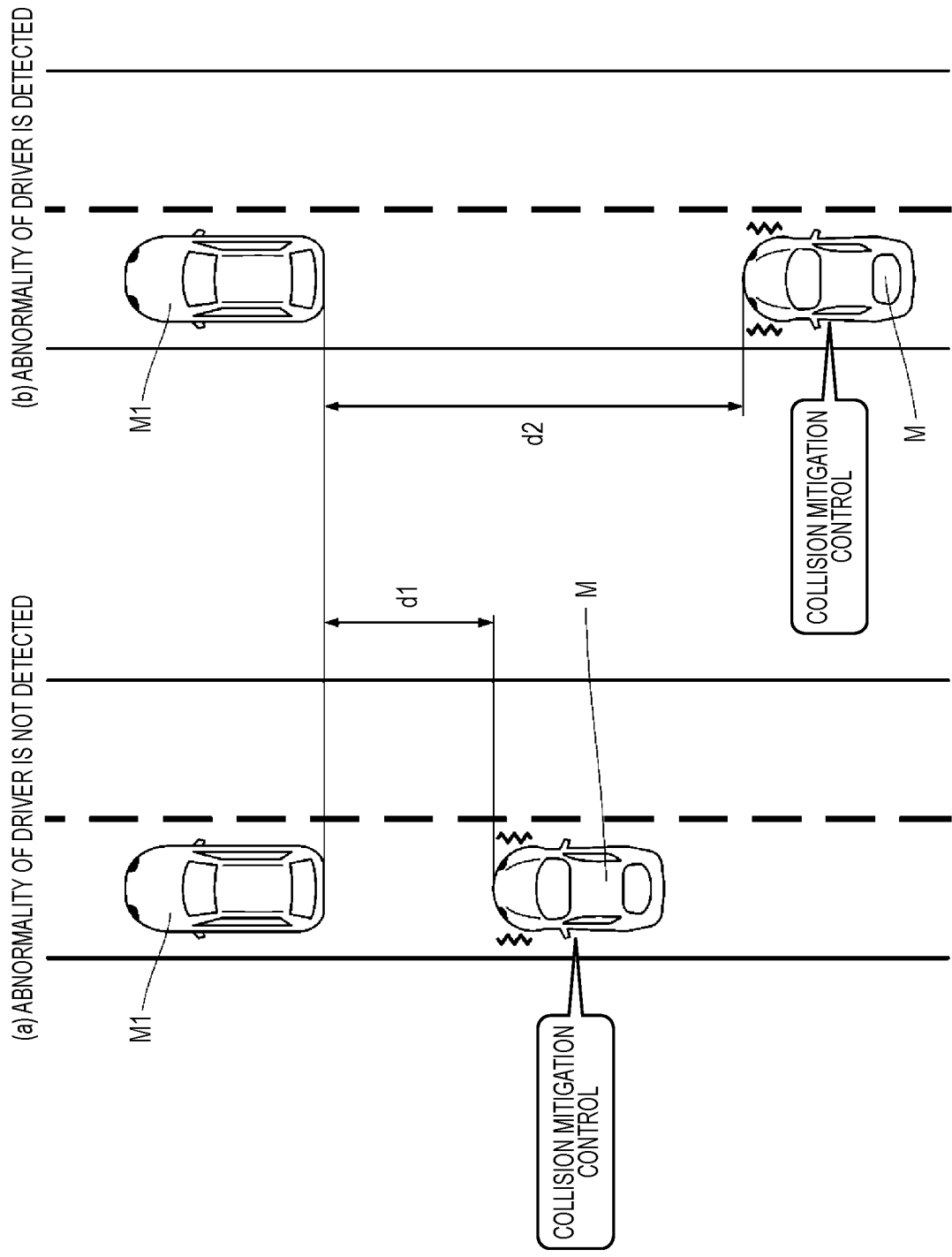
FIG. 8 is a diagram showing an example of execution conditions of the collision mitigation control when an abnormality of a driver is not detected and when the abnormality of the driver is detected.

For example, as shown in (a) of FIG. 8, when the abnormality of the driver is not detected, the second control unit 130 executes the collision mitigation control in response to an inter-vehicle distance between the traveling own vehicle M and the preceding vehicle M1 existing in front of the own vehicle M becoming d1. In contrast, as shown in (b) of FIG. 8, when the abnormality of the driver is detected, the second control unit 130 executes the collision mitigation control in response to the inter-vehicle distance between the traveling own vehicle M and the preceding vehicle M1 existing in front of the own vehicle M becoming d2 that is greater than d1. Accordingly, it is possible to prevent the collision mitigation control from being excessively executed when the abnormality of the driver is not detected, and when the abnormality of the driver is detected, the collision mitigation control is activated at an earlier stage, thereby improving the safety of the own vehicle M.

In the present specification and the like, at least the following matters are described. Although corresponding constituent elements and the like in the above embodiment are shown in parentheses, the present invention is not limited thereto.

(1) A vehicle control device (control device 100) that controls a vehicle (own vehicle M), the vehicle control device including:
- a recognition circuit (recognition unit 110) configured to recognize a surrounding situation of the vehicle;
- a first control circuit (first control unit 120) configured to execute first control of giving a first alarm to an occupant of the vehicle in response to a first execution condition being satisfied based on a recognition result of the recognition circuit;
- a second control circuit (second control unit 130) configured to execute second control of controlling braking or steering of the vehicle and giving a second alarm to the occupant in response to a second execution condition being satisfied based on the recognition result of the recognition circuit;
- an occupant abnormality detection circuit (occupant abnormality detection unit 140) configured to detect an abnormality of the occupant;
- a third control circuit (third control unit 150) configured to execute third control of decelerating or stopping the vehicle and giving a third alarm in response to the abnormality of the occupant being detected by the occupant abnormality detection circuit; and
- an arrangement circuit (arrangement unit 170) configured to arrange execution of the first control, the second control, and the third control,
- wherein the arrangement circuit
    causes the third control to be executed with priority over the first control when execution conditions of the first control and the third control are satisfied, and
    causes the second control to be executed with priority over the third control when execution conditions of the second control and the third control are satisfied.

According to (1), each of the first control, the second control, and the third control can be appropriately executed, and the safety of the vehicle can be improved. For example, in a state in which an abnormality occurs in the occupant, even if the first control of giving the first alarm to the occupant is executed, it is difficult for the occupant to take some action in response to the alarm. Therefore, when the abnormality of the occupant is detected, that is, when the execution condition of the third control is satisfied, even if the execution condition of the first control is satisfied, the third control including the travel control of decelerating or stopping the vehicle is preferentially executed, so that even if these execution conditions are satisfied at the same time, it is possible to appropriately control the vehicle by the third control, and the safety can be improved. In addition, when the execution conditions of the second control and the third control are satisfied, a priority of the second control including the travel control referred to as braking or steering of the vehicle may lead to an improvement in safety. Therefore, when the execution conditions of the second control and the third control are satisfied, the second control is preferentially executed, so that even if these execution conditions are satisfied at the same time, it is possible to appropriately control the vehicle by the second control, and the safety can be improved.

(2) The vehicle control device according to (1),
- wherein the arrangement circuit
    continues the third control when the first execution condition is satisfied during execution of the third control, and
    interrupts or stops the third control to execute the second control when the second execution condition is satisfied during the execution of the third control.

According to (2), even if the execution condition of the first control (that is, the first execution condition) is satisfied during the execution of the third control, it is possible to continue to appropriately control the vehicle by the third control that can further improve safety, and the safety can be improved. Further, according to (2), when the execution condition of the second control (that is, the second execution condition) is satisfied during the execution of the third control, it is possible to appropriately control the vehicle by the second control that can further improve safety after the execution condition is satisfied, and the safety can be improved.

(3) The vehicle control device according to (1) or (2),
- wherein the occupant abnormality detection circuit detects the abnormality of the occupant in response to a first detection condition being satisfied and a second detection condition being further satisfied after the first detection condition is satisfied,
- wherein the vehicle control device further includes a fourth control circuit (fourth control unit 160) configured to execute fourth control of giving a fourth alarm to the occupant during a period from when the first detection condition is satisfied to when the second detection condition is satisfied, and
- wherein the arrangement circuit
    is configured to arrange execution of the fourth control, and
    causes the first control to be executed with priority over the fourth control when execution conditions of the first control and the fourth control are satisfied.

It is considered that the first control executed based on the recognition result of the surrounding situation of the vehicle can contribute to improvement in safety more than the fourth control. According to (3), when the execution conditions of the first control and the fourth control are satisfied, the first control is preferentially executed, so that even if these execution conditions are satisfied at the same time, it is possible to appropriately control the vehicle by the first control, and the safety can be improved.

(4) The vehicle control device according to (3),
wherein the arrangement circuit interrupts or stops the fourth control to execute the first control when the first execution condition is satisfied during execution of the fourth control.

According to (4), when the execution condition of the first control (that is, the first execution condition) is satisfied during the execution of the fourth control, it is possible to appropriately control the vehicle by the first control that can further improve safety after the execution condition is satisfied, and the safety can be improved.

(5) The vehicle control device according to any one of (1) to (4),
wherein the second control circuit
is configured to be able to change the second execution condition in response to the abnormality of the occupant being detected by the occupant abnormality detection circuit, and
when the abnormality of the occupant is detected, changes the second execution condition such that the second control is more likely to be executed than when the abnormality of the occupant is not detected.

According to (5), when the abnormality of the occupant is detected, the second control can more likely to be executed than when the abnormality of the occupant is not detected. Accordingly, it is possible to prevent the second control from being excessively executed when the abnormality of the occupant is not detected, and it is possible to execute the second control at an earlier stage when the abnormality of the occupant is detected, thereby improving the safety of the vehicle.

The invention claimed is:

1. A vehicle control device that controls a vehicle, the vehicle control device comprising:
a recognition circuit configured to recognize a surrounding situation of the vehicle;
a first control circuit configured to execute first control of giving a first alarm to an occupant of the vehicle in response to a first execution condition being satisfied based on a recognition result of the recognition circuit;
a second control circuit configured to execute second control of controlling braking or steering of the vehicle and giving a second alarm to the occupant in response to a second execution condition being satisfied based on the recognition result of the recognition circuit;
an occupant abnormality detection circuit configured to detect an abnormality of the occupant;
a third control circuit configured to execute third control of decelerating or stopping the vehicle and giving a third alarm in response to the abnormality of the occupant being detected by the occupant abnormality detection circuit; and
an arrangement circuit configured to arrange execution of the first control, the second control, and the third control,
wherein the arrangement circuit:
causes the third control to be executed with priority over the first control when execution conditions of the first control and the third control are satisfied; and
causes the second control to be executed with priority over the third control when execution conditions of the second control and the third control are satisfied.

2. The vehicle control device according to claim 1,
wherein the arrangement circuit:
continues the third control when the first execution condition is satisfied during execution of the third control; and
interrupts or stops the third control to execute the second control when the second execution condition is satisfied during the execution of the third control.

3. The vehicle control device according to claim 1,
wherein the occupant abnormality detection circuit detects the abnormality of the occupant in response to a first detection condition being satisfied and a second detection condition being further satisfied after the first detection condition is satisfied,
wherein the vehicle control device further comprises a fourth control circuit configured to execute fourth control of giving a fourth alarm to the occupant during a period from when the first detection condition is satisfied to when the second detection condition is satisfied, and
wherein the arrangement circuit:
is configured to arrange execution of the fourth control; and
causes the first control to be executed with priority over the fourth control when execution conditions of the first control and the fourth control are satisfied.

4. The vehicle control device according to claim 3,
wherein the arrangement circuit interrupts or stops the fourth control to execute the first control when the first execution condition is satisfied during execution of the fourth control.

5. The vehicle control device according to claim 1,
wherein the second control circuit:
is configured to be able to change the second execution condition in response to the abnormality of the occupant being detected by the occupant abnormality detection circuit; and
when the abnormality of the occupant is detected, changes the second execution condition such that the second control is more likely to be executed than when the abnormality of the occupant is not detected.

* * * * *